United States Patent
MacDuff

(10) Patent No.: US 7,364,609 B2
(45) Date of Patent: Apr. 29, 2008

(54) METHOD AND KIT FOR USE WITH STANDARD PIPE COUPLINGS TO CONSTRUCT A DE-AERATOR

(76) Inventor: James MacDuff, 1284 Montrose Pl., Victoria, BC (CA) V8T 2K6

( * ) Notice: Subject to any disclaimer, the term of this patent is extended or adjusted under 35 U.S.C. 154(b) by 221 days.

(21) Appl. No.: 11/052,705

(22) Filed: Feb. 7, 2005

(65) Prior Publication Data

US 2005/0132889 A1    Jun. 23, 2005

Related U.S. Application Data

(63) Continuation-in-part of application No. 10/160,587, filed on May 31, 2002, now Pat. No. 6,893,485.

(51) Int. Cl.
*B01D 19/00* (2006.01)

(52) U.S. Cl. .............. 96/165; 96/204; 96/206; 137/176; 137/202; 137/210; 210/120; 210/436

(58) Field of Classification Search ............ 96/165, 96/204, 163, 206, 166, 167; 137/202, 176, 137/210, 429; 210/120, 436

See application file for complete search history.

(56) References Cited

U.S. PATENT DOCUMENTS

| | | | |
|---|---|---|---|
| 351,994 A | 11/1886 | Moore | |
| 430,448 A | 6/1890 | Todd | |
| 852,584 A | 5/1907 | Skinner | |
| 897,895 A | 9/1908 | Harrison | |
| 899,077 A | 9/1908 | Rowe | |
| 1,114,270 A | 10/1914 | Kinealy | |
| 1,119,980 A * | 12/1914 | Mulligan | 96/165 |
| 2,237,520 A | 4/1941 | Brubaker, et al. | |
| 2,375,646 A | 5/1945 | Grossi | |
| 2,611,446 A | 9/1952 | Kennedy et al. | |
| 2,742,049 A | 4/1956 | Granberg | |
| 2,897,913 A | 8/1959 | Hudson | |
| 2,904,182 A | 9/1959 | Baumann | |
| 3,668,822 A | 6/1972 | Mannion et al. | |
| 3,854,906 A | 12/1974 | Roffelsen | |
| 4,027,691 A | 6/1977 | Roffelsen | |
| 4,381,928 A * | 5/1983 | Roffelsen | 96/165 |
| 4,427,421 A | 1/1984 | Jensen et al. | |
| 4,456,172 A | 6/1984 | Roffelsen | |
| 4,645,518 A | 2/1987 | Roffelsen | |
| 4,678,589 A | 7/1987 | Ayres, Jr. | |
| 4,718,922 A | 1/1988 | Roffelsen | |
| 4,730,638 A * | 3/1988 | Hazelton | 137/202 |
| 4,961,847 A | 10/1990 | Amr | |
| 5,123,938 A * | 6/1992 | Nobel | 96/165 |
| 5,490,874 A * | 2/1996 | Kuster et al. | 96/204 |
| 5,676,740 A | 10/1997 | Schwartz et al. | |
| 6,119,951 A * | 9/2000 | Roffelsen | 237/66 |

* cited by examiner

*Primary Examiner*—Duane Smith
*Assistant Examiner*—Douglas J. Theisen
(74) *Attorney, Agent, or Firm*—Dority & Manning, P.A.

(57) ABSTRACT

A kit for constructing a de-aerator for a fluid distribution system includes a gas concentrator adapted to be received in chamber of a T-coupling provided with the kit. A cap is provided that closes a cap connector integrally formed with the T-coupling. The cap supports a valve that opens and closes in response to fluctuations of a level of the fluid in the cavity as air is accumulated in the cavity and discharged by an opening of the valve.

18 Claims, 6 Drawing Sheets

METHOD AND KIT FOR USE WITH STANDARD PIPE COUPLINGS TO CONSTRUCT A DE-AERATOR

CROSS-REFERENCE TO RELATED APPLICATIONS

This application is a Continuation-In-Part of U.S. patent application Ser. No. 10/160,587, filed May 31, 2002, and which issued May 17, 2005 as U.S. Pat. No. 6,893,485.

MICROFICHE APPENDIX

Not Applicable.

TECHNICAL FIELD

This invention relates to gas removal from liquid distribution systems, and, in particular, to a de-aerator for removing gas suspended in liquids used for temperature control in closed-loop heating and cooling systems.

BACKGROUND OF THE INVENTION

A common problem with liquid heating and cooling systems, and liquid distribution systems in general, is the accumulation of gas pockets in distribution pipes. Dissolved or suspended gases separate from the liquid and naturally collect at various points in the system. Accumulations of gas may cause vapor lock that inhibits the effective distribution of the heated or cooled liquid, diminishing the efficiency of the heating or cooling system. Gas pockets may also induce noise and cause damaging cavitation in liquid distribution pumps. The introduction of gas into liquid distribution systems is therefore usually carefully controlled, but it cannot be completely avoided. Maintenance procedures, oxygen infiltration, and the injection of fresh liquid into the system all introduce some gas into the system.

Liquids that readily dissolve gasses at a temperature and pressure at which the liquids are injected into a system, and emit the gasses under operating temperatures and pressures in the system, are especially prone to the problems associated with gas accumulation. Such liquids include water, which readily absorbs oxygen and other gasses when cool, but emits the absorbed gases when heated. Because of its availability and heat transfer properties, water is commonly used in heating and cooling systems. Besides the undesirable affects of vapor locks, oxygen is a principal agent responsible for the corrosion of metal. Consequently, the removal of oxygen from heating and cooling systems is all the more desirable.

Gas removal from heating and cooling systems is well known. The gas is removed using venting devices referred to as de-aerators that are connected in various ways to the distribution pipes of the heating and cooling systems. The known de-aerators are generally expensive units that include a plurality of components encased in one or more metal housings connected to the distribution pipes. Inexpensive de-aerators are available, but they are generally much less effective at removing gas from the liquid.

An example of an expensive de-aerator is described in U.S. Pat. No. 5,490,874, entitled DE-AERATOR APPARATUS, which issued to Hans L. Kuster et al. on Feb. 13, 1996. The de-aerator includes a housing that forms an upright cylindrical chamber having fittings on opposite sides for the connection of the distribution pipes. The liquid flows through the distribution pipes into the chamber, and gas extracted from the liquid is exhausted through a valve controlled vent. The valve is opened and closed by the motion of a float that is buoyantly displaced by the rise and fall of the level of the liquid in the chamber. When the level of the liquid is below a certain point the valve is opened, permitting the accumulated gas to escape. When the liquid level is above the certain point the valve is closed, preventing the contents of the chamber from escaping. A concentrator that partially disrupts the flow of the liquid through the chamber extracts the gas bubbles and microbubbles from a liquid flowing through the chamber. The concentrator has a large surface area to volume ratio to facilitate the removal of gas from the liquid.

The less expensive de-aerators are typically adapted to be threadedly attached to a pipe fitting, such as a venting nozzle of a radiator, or other heating appliance. The less expensive de-aerators are constructed in a similar way with a float-based valve venting mechanism, but do not include a concentrator with a large surface area for removing gas from the liquid. The less expensive de-aerators are therefore adapted to remove large bubbles of gas from the liquid that rise under the force of buoyancy, but are inefficient at extracting finer bubbles and microbubbles from the liquid.

A disadvantage of all the known de-aerators is that they are expensive to construct, inefficient at extracting finer bubbles and microbubbles, and/or that they require special fittings that are time-consuming to install in a heating or cooling distribution system.

There therefore remains a need for a low-cost de-aerator that is easily installed and capable of efficiently extracting gas from a liquid conveyed through a distribution system.

SUMMARY OF THE INVENTION

It is therefore an object of the present invention to provide a low-cost kit for constructing a de-aerator that can efficiently extract gas from a liquid conveyed through a liquid distribution system.

In accordance with one aspect of the invention a kit is provided for assembling a de-aerator for removing gas from a liquid distribution system. The kit includes a T-coupling for installation in a run of pipe of the liquid distribution system. The T-coupling has a chamber defined by a cylindrical wall that is axially aligned with two connectors of the T-coupling. The cylindrical wall is only interrupted by one cylindrical opening that is axially aligned with a third connector. The cylindrical opening passes transversely through the cylindrical wall. The kit also includes a cap having a mating surface for sealed connection with one of the three connectors, and a valve in fluid communication with the chamber, with a valve stem connected to a float for selectively opening the valve only when the liquid in the camber is displaced by the gas below a predetermined level. The mating surface may include a thread that permits the cap to be threadedly connected to either the T-coupling or a fitting adapted to be sealedly connected to the T-coupling.

The kit also includes a gas concentrator for extracting gas from the liquid flowing through the chamber, the concentrator being adapted to be retained within the chamber below the valve to encourage extracted gas to rise into a space below the valve. The gas concentrator may be captively held in the flow of the liquid within the chamber because of its size, which is too large to fit through the connectors that are coupled to the run of pipe. The gas concentrator causes microbubbles and bubbles of gas to merge to form larger bubbles. The larger bubbles rise under the force of buoyancy and accumulate beneath the valve.

The gas concentrator may be formed of a wire mesh, such as a woven wire mesh. The woven wire mesh may, for example, be cut and rolled to form a circular cylinder with a spiral cross-section. The concentrator may also be a brush, and may be constructed of a synthetic polymer.

The cap preferably supports the valve that releases the gas when the liquid level in the fitting falls below a predetermined level. Alternatively, the valve may be supported by the fitting.

In accordance with another aspect of the invention a method is provided for removing gas suspended in a liquid conveyed through a liquid distribution system. The method involves installing a T-coupling in a run of pipe of the liquid distribution system so that two pipe connectors of the T-coupling are connected to the run of pipe, and a third cap connector extends above a chamber of the T-coupling. Installing involves soldering or otherwise joining the T-coupling to the run of pipes at the two pipe connectors. The chamber is defined by a cylindrical wall that is axially aligned with two of the three connectors, and is only interrupted by one cylindrical opening passing transversely through the cylindrical wall. The cylindrical opening being axially aligned with a third connector.

Once the T-coupling is installed, a gas concentrator is inserted into the chamber so that the gas concentrator is retained within the chamber below the cap connector, and the cap is sealedly connected to the cap connector. The cap includes a float-actuated valve for venting gas accumulated by the gas concentrator while inhibiting the escape of liquid from the liquid distribution system. Sealedly connecting the cap to the cap connector may involve threadedly securing the cap to the cap connector, or threadedly securing the cap to a fitting that is sealedly connected to the cap connector.

The run of pipe may be horizontal, in which case the two pipe connectors are the two of the three connectors axially aligned with the cylindrical wall. Alternatively the run of pipe is horizontal to vertical, and the cap connector is one of the two of the three connectors axially aligned with the cylindrical wall.

In accordance with a further aspect of the invention a kit is provided for a de-aerator for removing gas from a liquid distribution system used for radiant heating. The kit includes a cap for sealed connection with a T-coupling installed in a run of pipe of the liquid distribution system that encloses a chamber through which liquid flows. The cap supports a float-actuated valve for selectively opening and closing the valve in accordance with a level of the liquid within the T-coupling. The chamber is defined by a cylindrical wall axially aligned with two connectors. The cylindrical wall is interrupted only by one cylindrical opening axially aligned with a third connector, that passes transversely through the cylindrical wall. The kit also includes a gas concentrator adapted to be retained within the chamber below the valve to encourage gas to rise from the chamber into a space below the cap.

The kits in accordance with the invention are consist of economically constructed pieces, and provide an easily and quickly installed, easily maintained, and effective de-aerator because the flow through the chamber is not impeded by obstructions or unnecessary openings that affect the flow through the chamber.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
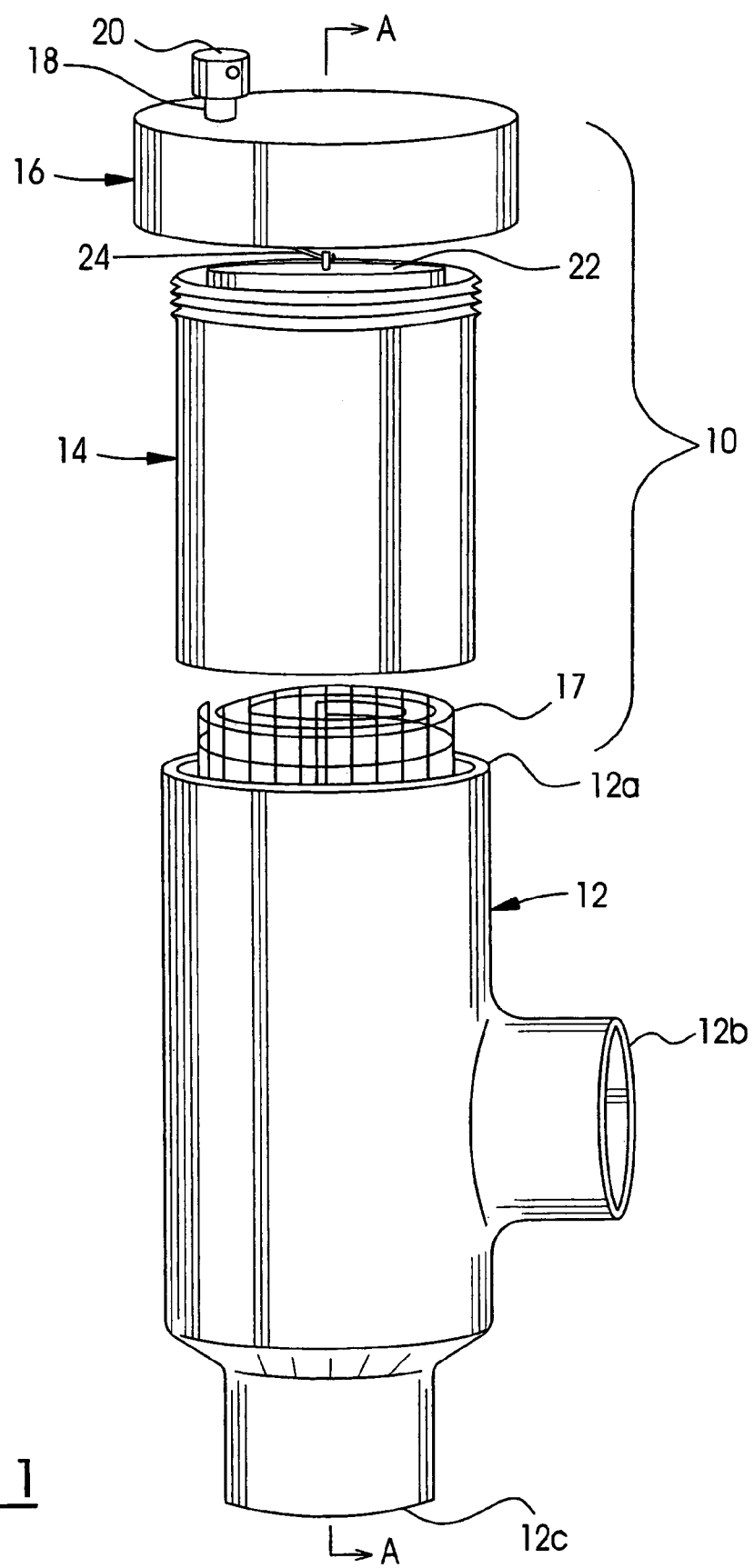
FIG. 1. is an exploded perspective diagram of a de-aerator constructed using a kit in accordance with the invention, the kit being installed in a standard T-coupling oriented in a vertical-to-horizontal run of pipe in a fluid distribution system.

The invention provides an effective and inexpensive kit for a de-aerator that may include a T-coupling, or may be installed in a standard T-coupling in a fluid distribution system, such as a radiant heating system.

Some embodiments of the kit, generally indicated by reference numeral 10, are designed to be installed in a standard T-coupling 12 having connectors 12a, 12b and 12c which receive standard fluid distribution pipes (not shown) that are secured to the coupling 12 by soldering, threaded joints, or the like.

Figure 2:
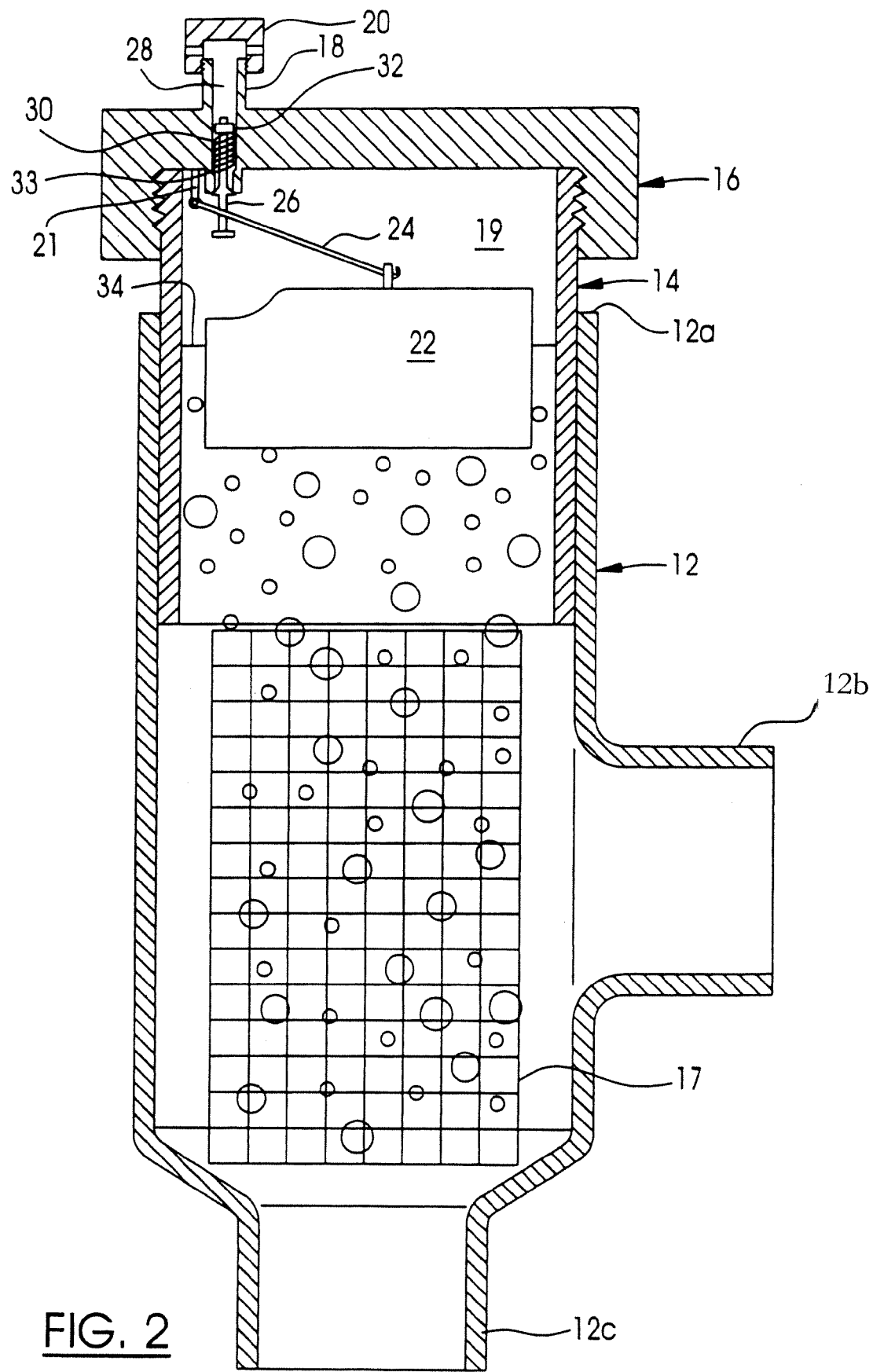
FIG. 2. is a cross-sectional view taken along lines A-A of FIG. 1, showing the de-aerator in a non-venting state.

The embodiment of the kit 10 illustrated in exploded and cross-sectional views in FIGS. 1, and 2 respectively includes a fitting 14 that is extruded, cast and/or machined to a diameter of a pipe to be received in a connector 12a of the coupling 12. The kit 10 further includes a cap 16 that is connected to the fitting 14 in a fluid-tight seal, and a gas concentrator 17, which in this example is a wire mesh, as will be explained below in more detail.

The fitting 14 is a cylinder preferably threaded at one end to permit connection of the cap 16, which is correspondingly threaded. The fitting 14 may be soldered or glued inside the pipe coupling 12a, in a manner well known in the art. The fitting 14 is hollow and forms a space beneath a valve 18 where gas may accumulate when installed.

The cap 16 preferably supports the valve 18. The float-actuated valve 18 includes a valve cap 20 that permits gas to be vented from the space beneath the cap 16. A float 22 is connected to a lever arm 24, which is connected to a pivot support 21 affixed to the underside of the cap 16. A valve stem 26, which may be engaged by the lever arm 24, is biased by the action of a compression spring 30 to remain in a closed position to seal a venting channel 28, unless a weight of the float 22 overcomes the bias of the compression spring 30. When the level of the liquid in the chamber 19, by which the float 22 is supported, is displaced below a certain threshold by accumulated gas, the weight of the float 22 imparted to the lever arm 24 bears on the valve stem 26 to overcome the bias of the compression spring 30, opening the valve 18.

Figure 3:
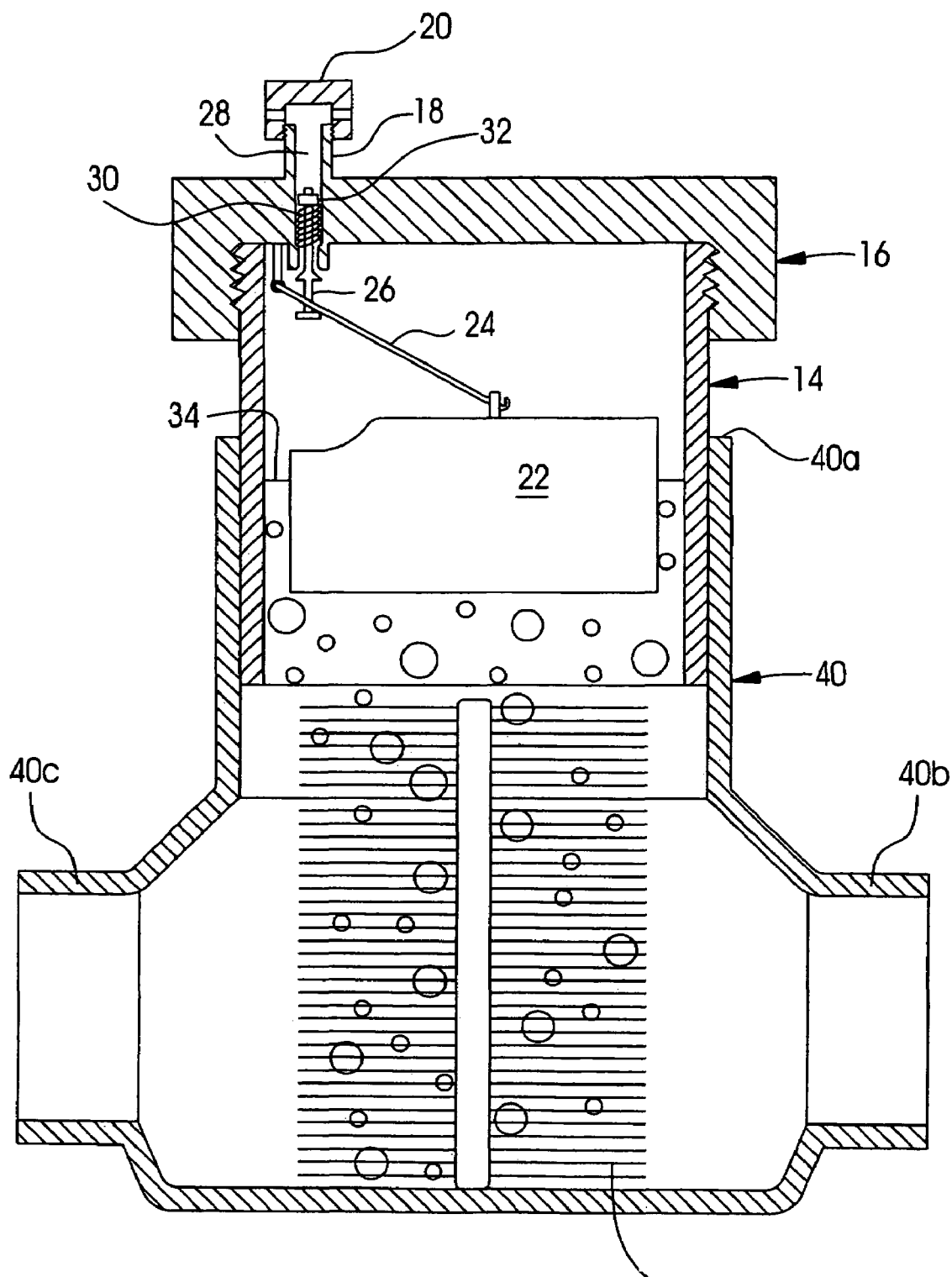
FIG. 3. is a cross-sectional view of a de-aerator constructed using a kit in accordance with the invention in a gas venting state, the kit being installed in a standard T-coupling in a horizontal run of pipe in a fluid distribution system.

The compression spring 30 is captured between a valve stem centralizer 32 and a spring seat 33 in the venting channel 28. The valve stem centralizer 32 guides the valve stem 26 as it is reciprocated within the venting channel 28, but does not impede the escape of gas through the valve 18. As shown in FIG. 2, the amount of gas accumulated in the space below the cap 16 is inadequate to open the valve 18. In comparison, FIG. 3 illustrates a condition in which the amount of gas accumulated in the space below the cap 16 displaces the level of the liquid to an extent that the lever arm 24 is pulled downwardly by the weight of the float 22, causing the valve 18 to be open and the accumulated gas. Such valve mechanisms are known in the art.

The gas concentrator 17 may be any one of various shapes and constructions known in the art. Preferably the surface area to volume ratio is maximized so that the flow is not overly restricted, but the interaction with gas bubbles suspended in the liquid is enhanced. Typical gas concentrators known in the art include cylindrical wire brushes, helicoidal metal structures and rows of combs or bristles. An alternative that is robust, efficient and inexpensive to construct, is a wire mesh fabric cut in a sheet, and loosely coiled to form a substantially cylindrical wire mesh coil with a spiral cross-section. The size of the sheet is chosen so that the wire mesh coil is easily inserted into the fixture, but the wire mesh coil is captively held in the chamber 19 through which liquid beneath the float 22 streams. As an alternative, the gas concentrator 17 may be a brush structure as shown in FIG. 3, and may be constructed from a synthetic polymer, for example.

The de-aerator functions to release gas from a fluid distribution system. Bubbles and microbubbles of gas are trapped by surface tension around parts of the gas concentrator 17. These bubbles and microbubbles aggregate to form larger bubbles of gas, which rise under their buoyancy to accumulate a layer of gas in the vertically-oriented fitting 14. The gas displaces the liquid causing the level of the liquid 34 to drop. The float 22, falling with the level of the liquid 34 causes the lever arm 24 to pivot enough that the valve stem 26 is separated from a valve seat of the venting channel 28. The channel is thereby opened and venting of gas occurs. Evacuation of the gas through the venting channel 28 causes the level of the liquid to rise in response to fluid pressure in the distribution system. The rise in fluid level raises the float which closes the valve after the liquid rises above a predetermined level.

FIG. 3 is a cross-sectional view of the kit 10 installed in a T-coupling 40, which includes connectors 40a, 40b, and 40c, in a horizontal run of pipe (not shown). The installation of the de-aerator 10 begins with the selection of a point in the liquid distribution system at which the de-aerator 10 is to be installed. Preferably the installation point(s) is(are) located so that the gases, which are lighter than the liquid, will naturally collect there. After the point(s) of installation is(are) selected, an appropriately configured T-coupling 40 is installed at each point(s). The T-coupling(s) 40 is(are) installed so that the connector 40a for receiving the kit 10 is substantially vertically oriented. The fitting 14 is connected to the T-coupling using solder or glue, for example. The gas concentrator 17 is inserted into the coupling 40a, and the cap 16 is secured to cover the fitting 14 in a fluid-tight seal.

The connectors 12a, 40a of T-couplings 12, 40 preferably have greater cross-sectional area than pipes (not shown) to which the T-couplings 12, 40 are connected. This has two advantages. First, the gas concentrator 17 can be larger and therefore more efficient. Second, the flow rate of the liquid through the gas concentrator is slower than the flow rate through the pipes. The slowing of the liquid helps release gas bubbles that are suspended in the liquid.

Figure 4:
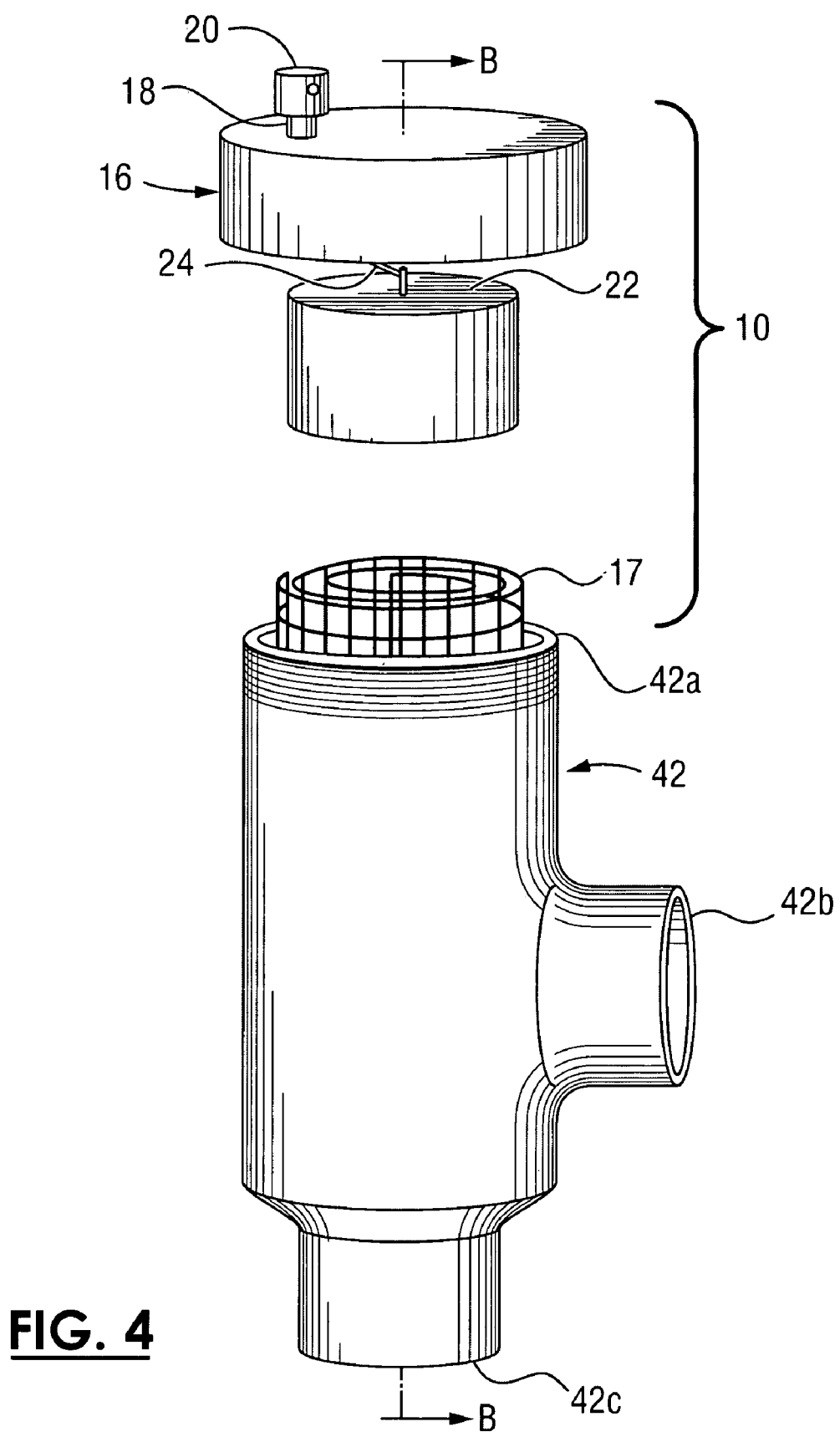
FIG. 4. is an exploded perspective diagram of a de-aerator constructed using a kit in accordance with the invention, the kit being installed in a standard T-coupling with a threaded top end, oriented in a vertical-to-horizontal run of pipe in a fluid distribution system.
Figure 5:
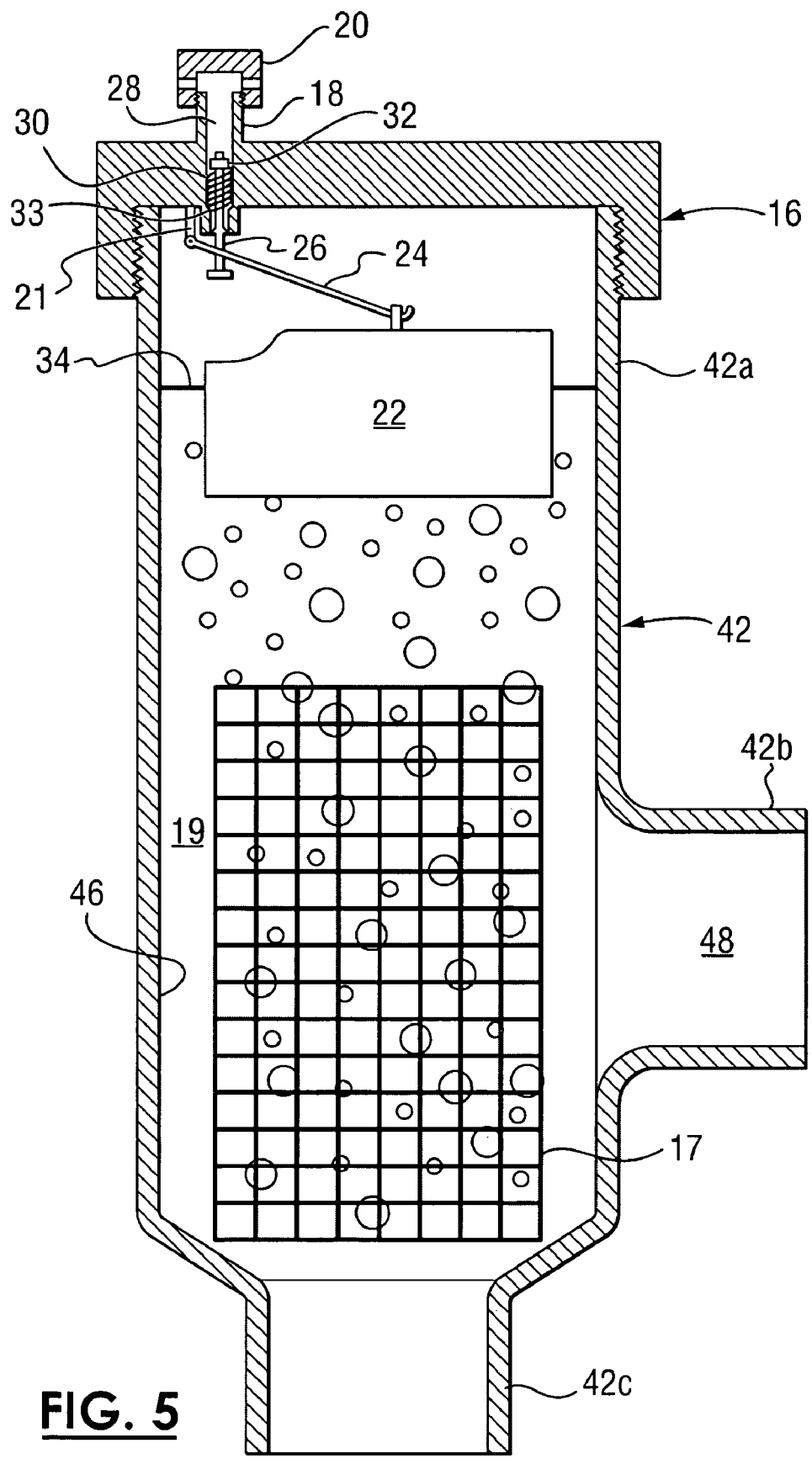
FIG. 5. is a cross-sectional view taken along lines B-B of FIG. 4, showing the de-aerator in a non-venting state.
Figure 6:
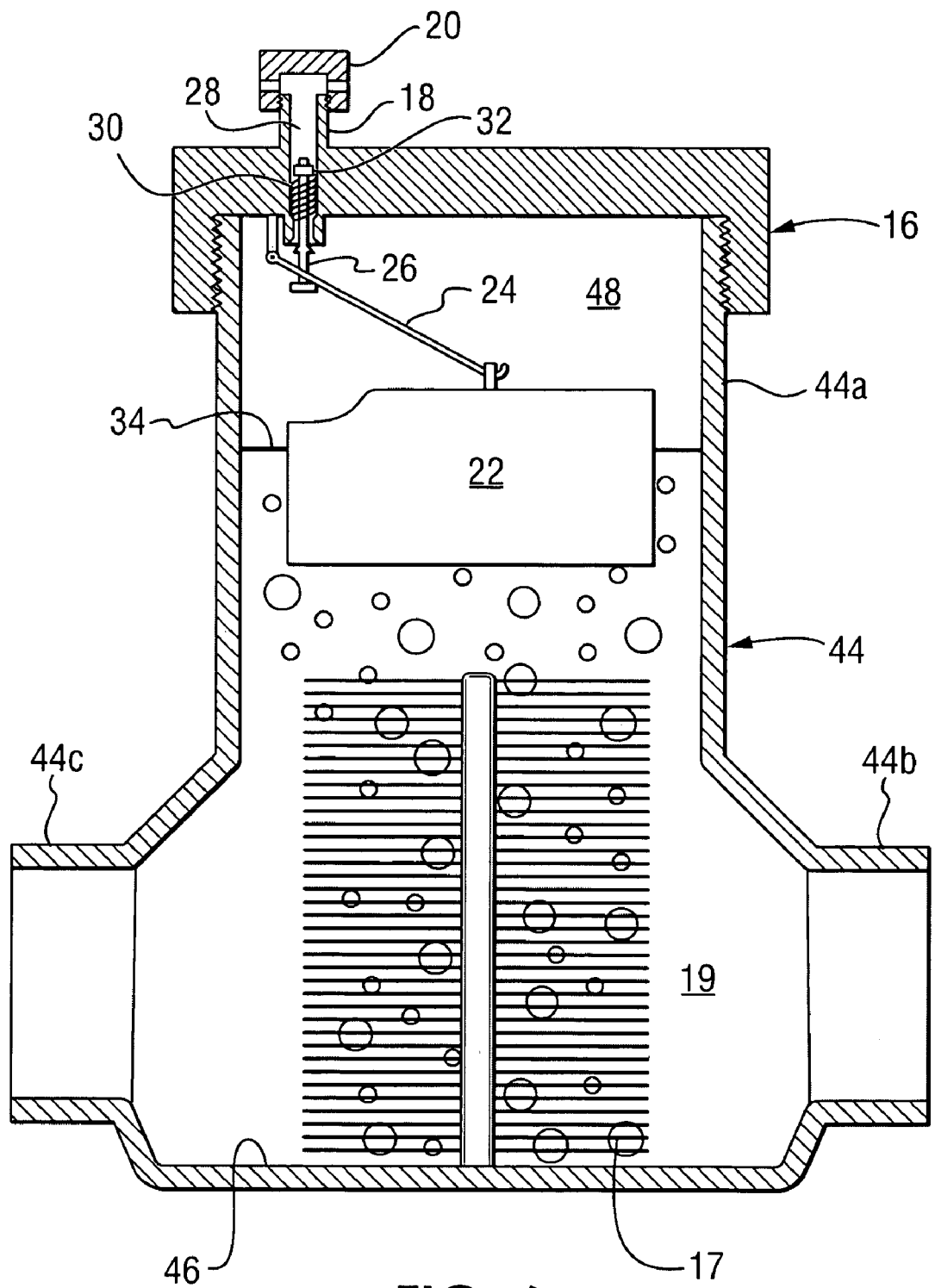
FIG. 6. is a cross-sectional view of a de-aerator constructed using a kit in accordance with the invention in a gas venting state, the kit being installed in a standard T-coupling having a threaded top end in a horizontal run of pipe in a fluid distribution system.

While the foregoing embodiments all include a fitting 14 that is disposed partially within the T-coupling 12, 40 and sealably coupled (e.g. soldered or glued) to the T-coupling, as shown in FIGS. 4-6, the fitting 14 may be excluded if the T-coupling itself permits sealed coupling of the cap 16.

FIGS. 4, 5 respectively show an exploded isometric, and a cross-sectional view of a kit in accordance with another embodiment of the invention. It will be noted that the cap 16, valve system 26,32, and gas concentrator 17 are identical to those shown in the previous drawings, and their descriptions are not repeated here. The cap 16 provides a float-actuated valve as described above.

In accordance with the illustrated embodiment, a T-coupling 42 with a cap connector 42a for direct sealed connection with cap 16 is provided. More specifically, a pin threaded end of the cap connector 42a is complementary with a box thread of the cap 16. The threaded connection ensures a sealed attachment of the cap 16 to the T-coupling 42. The threaded connection facilitates cleaning and replacing the gas concentrator 17. It will of course be apparent to those skilled in the art that the cap 16 could alternatively be pin threaded and the cap connector 42a box threaded, in other embodiments, and that other connection means known in the art could equally be used. Accordingly, different engaging surfaces can be provided on the cap connector 42a and cap 16.

Preferably the T-coupling 42 is provided with the same general features of the T-coupling 12, and may be made of brass, bronze, or steel. The T-coupling 42 may be sealingly connected to pipes of the fluid distribution system in any manner known in the art, and different configurations of pipe connectors 42b,c can be provided accordingly. In the illustrated embodiments, the pipe connectors 42b,c are configured to permit soldered connections to be made with respective pipes to close the fluid distribution system.

It will be noted that T-coupling 42 defines the chamber 19 of substantially the same configuration as that shown in FIG. 2. The chamber 19 is defined by a cylindrical wall 46 (FIG. 5) that is interrupted by a cylindrical opening 48, defined by the pipe connector 42b in FIGS. 4, 5. Cylindrical opening 48 is concentric with the pipe connector 42b, and transverse to the axis of the cylindrical wall 46. The cylindrical wall 46 is coaxial with both cap connector 42a and pipe connector 42c. Because of this configuration of the chamber 19 the flow of fluid through the T-connector is superior to flow through fittings that are have more interruptions in the cylindrical wall in the form of openings to recesses and/or in the form of obstructions.

While cap connector 42a is of a larger diameter than that of the pipe connectors 42b,c that are adapted to couple to a vertical-to-horizontal run of pipe in the fluid distribution system, it will be appreciated by those skilled in the art that this is not necessary. However, it is beneficial if the gas concentrator fits within the chamber but is too large to exit the chamber into the run of pipe, as this permits the gas concentrator to be retained within the chamber 19 without any connection to the cap 16, the T-coupling 42, or any other part of the fluid distribution system. As previously stated it is further advantageous that the chamber 19 provide an enlarged cross-section in the run of pipe to enhance the extraction of the gas.

FIG. 6 illustrates a cross-sectional view of another embodiment of the invention that is similar to that shown in FIG. 5 in that the cap is directly connected to the T-fitting 44, and similar to FIG. 3 in that the T-coupling's cylindrical wall 46 is in axial alignment with the two pipe connectors that serve as ingress and egress pipe connectors 44b, 44c for connection to a horizontal run of pipe, and it is the cylindrical opening 48 that provides the cap connector 44a for connection of the cap 16.

It will be appreciated by those skilled in the art that there are numerous operationally equivalent embodiments of the valve mechanism, and the gas concentrators that can be used in a kit 10 in accordance with the present invention. It should also be understood that although the valve mechanism is supported by the cap, it may likewise be supported by a sidewall 46 of the fitting 42, or the T-coupling 44.

The embodiments of the invention described above are therefore intended to be exemplary only. The scope of the invention is therefore intended to be limited solely by the scope of the appended claims.

I claim:

1. A kit for assembling a de-aerator for removing gas from a liquid distribution system comprising:
   a T-coupling for installation in a run of pipe in the liquid distribution system, the T-coupling providing a chamber defined by a cylindrical wall that is axially aligned with a cap connector and a pipe connector of the T-coupling, the cylindrical wall being interrupted only by one cylindrical opening passing transversely through the cylindrical wall, the cylindrical opening being defined by a second pipe connector and the chamber providing an unobstructed fluid path through the T-coupling;
   a cap having a mating surface for sealed connection to the cap connector;
   a valve in fluid communication with the chamber, and a valve stem connected to a float for selectively opening the valve only when the liquid in the chamber is displaced by the gas below a predetermined level; and
   a gas concentrator for extracting gas from the liquid flowing through the chamber, the gas concentrator retained within the chamber below the valve to ensure that extracted gas rises into a space below the valve.

2. The kit as claimed in claim 1 wherein the first and second pipe connectors of the T-coupling are for ingress and egress of fluid connected to the run of pipe.

3. The kit as claimed in claim 1 wherein the mating surface of the cap comprises a thread complementary with a thread on the cap connector.

4. The kit as claimed in claim 3 wherein the cap has a box thread and the cap connector has a pin thread.

5. The kit as claimed in claim 2 wherein the chamber has a larger diameter than the run of pipe connected to the first and second pipe connectors.

6. The kit as claimed in claim 5 wherein the gas concentrator fits within the chamber and is too large to exit the chamber into the run of pipe.

7. The kit as claimed in claim 1 wherein the float is connected to a valve stem by a lever arm and is biased to a closed position so that unless a weight of the float bears on the valve stem to open the valve, the valve stem remains closed.

8. The kit as claimed in claim 7 wherein the valve is supported by the cap and the lever arm is connected to a pivot that is also supported by the cap.

9. The kit as claimed in claim 1 wherein the gas concentrator comprises a wire mesh.

10. The kit as claimed in claim 9 wherein the gas concentrator comprises a woven wire mesh.

11. The kit as claimed in claim 10 wherein the gas concentrator comprises a sheet of woven wire mesh that is rolled into a spiral that forms a circular cylinder.

12. The kit as claimed in claim 1 wherein the gas concentrator comprises a brush.

13. The kit as claimed in claim 12 wherein the brush comprises a structure manufactured using a synthetic polymer.

14. A kit for assembling a de-aerator for removing gas from a liquid distribution system comprising:
    a T-coupling for installation in a run of pipe in the liquid distribution system, the T-coupling providing a chamber defined by a cylindrical wall that is axially aligned with first and second pipe connectors of the T-coupling, the cylindrical wall being interrupted only by a cylindrical opening passing transversely through the cylindrical wall, the cylindrical opening being defined by a cap connector, the chamber providing an unobstructed fluid path through the T-coupling;
    a cap having a mating surface for sealed connection to the cap connector;
    a valve in fluid communication with the chamber, and a valve stem connected to a float for selectively opening the valve only when the liquid in the chamber is displaced by the gas below a predetermined level, wherein the float is connected to the valve stem by a lever arm that is pivotally connected by a pivot bracket to the cap, and wherein the valve is supported by the cap and the lever arm is connected to a pivot that is also supported by the cap; and
    a gas concentrator for extracting gas from the liquid flowing through the chamber, the gas concentrator retained within the chamber below the valve to ensure that extracted gas rises into a space below the valve.

15. The kit as claimed in claim 14 wherein the gas concentrator comprises a wire mesh.

16. The kit as claimed in claim 15 wherein the gas concentrator is a wire mesh sheet rolled into a spiral to form a substantially circular cylinder.

17. The kit as claimed in claim 14 wherein the gas concentrator is a brush.

18. The kit as claimed in claim 17 wherein the brush is made from a synthetic polymer.

* * * * *